(12) United States Patent
Parienti

(10) Patent No.: US 8,831,800 B2
(45) Date of Patent: Sep. 9, 2014

(54) AUTOMATED COLLECTIVE TRANSPORT SYSTEM

(76) Inventor: Raoul Parienti, Nice (FR)

(*) Notice: Subject to any disclaimer, the term of this patent is extended or adjusted under 35 U.S.C. 154(b) by 1222 days.

(21) Appl. No.: 13/055,511

(22) PCT Filed: Jul. 23, 2008

(86) PCT No.: PCT/FR2008/001086
§ 371 (c)(1),
(2), (4) Date: Jan. 24, 2011

(87) PCT Pub. No.: WO2009/044003
PCT Pub. Date: Apr. 9, 2009

(65) Prior Publication Data
US 2011/0125345 A1    May 26, 2011

(30) Foreign Application Priority Data
Jul. 23, 2007 (FR) .................................. 07 05313

(51) Int. Cl.
*B61B 11/00* (2006.01)

(52) U.S. Cl.
USPC ............. 701/19; 701/23; 701/41; 701/117; 180/167; 180/168; 180/401

(58) Field of Classification Search
USPC ........ 180/167, 168, 401; 701/23, 117, 19, 24, 701/301, 41; 340/903, 905, 435, 436, 902
See application file for complete search history.

(56) References Cited

U.S. PATENT DOCUMENTS

| | | | |
|---|---|---|---|
| 4,817,750 A | 4/1989 | Ishida et al. | 180/168 |
| 5,774,069 A * | 6/1998 | Tanaka et al. | 340/903 |
| 5,781,119 A * | 7/1998 | Yamashita et al. | 340/903 |
| 5,940,303 A | 8/1999 | Sakai et al. | 364/478.02 |
| 6,049,745 A | 4/2000 | Douglas et al. | 701/23 |
| 6,169,954 B1 * | 1/2001 | McCrary | 701/117 |
| 6,237,504 B1 * | 5/2001 | Tanahashi et al. | 104/243 |
| 2006/0200280 A1* | 9/2006 | Kono et al. | 701/19 |
| 2007/0016341 A1 | 1/2007 | Nagasawa et al. | 701/1 |

FOREIGN PATENT DOCUMENTS

FR   2 707 755   1/1995
FR   2 766 782   2/1999

* cited by examiner

*Primary Examiner* — Adam Tissot
(74) *Attorney, Agent, or Firm* — James C. Lydon

(57) ABSTRACT

Automated transport system including at least one automotive vehicle (10) without a driver and one central computer (14), the vehicle being able to go automatically from a departure point to a destination point using signals transmitted by the central computer and following a rail (12) integrated in the pavement. The rail is a rubber strip or equivalent mounted on the pavement having continuous optical characteristics and having chip contactless devices or transponders (20) at regular spacing. Each vehicle is equipped with localization and detection means (18) adapted to identify the strip's optical characteristics in order to follow the strip during its motion and to detect localization signals received from the transponders reacting to the radio frequency signals in order to localize the vehicle.

9 Claims, 4 Drawing Sheets

AUTOMATED COLLECTIVE TRANSPORT SYSTEM

TECHNOLOGY FIELD

The present invention deals with a urban transportation system mainly using electric propulsion and with the aim of taking one or several passengers from one point of a town to another or more broadly within a urban area, and it deals, more specifically, with an automated public and individual transport system.

STATE OF THE TECHNOLOGY

At present, the urban transport means that are proposed to the public mainly consist in <<heavy traffic>> means such as bus, tramway, or subway. These means, that can carry a large number of people along the main strategic axis of a town present the drawback of being limited to sections of the town and in addition do not provide a user friendly environment to the public.

Other means have been developed, such as bicycle or a few self-service vehicles. However, it appears that today, there is no urban transportation mean suitable to everyone (children, elderly people, blind people, or people without a driving license), and that can carry passengers in private environment from one point of a town to another.

However, document EP 1,564,614 describes a public transport system including a vehicle without driver that can go from a starting point to a destination point while following a rail that is incorporated in pavement of the road, thanks to electromagnetic signalling. Unfortunately, this system lacks flexibility, and gees not allow the use of several vehicles, and it cannot be operated to replace a full public transportation network such as a tramway network since it does not include a central management unit nor a localisation system that allows the accurate localisation of the vehicle.

PRESENTATION OF THE INVENTION

The aim of the invention is to provide an automated public transportation system that does not require the heavy infrastructure investments necessary in conventional public transportation system such as tramways.

Another aim of the invention is to provide an automated public and individual transport system that can allow several vehicles to join in a train of vehicles, whether all vehicles are going to the same destination or not.

Another aim of the invention is to provide an automated public transport system that can include localisation means in order to continuously localize each vehicle of the system.

The aim of the invention is therefore to provide an automated public transport system that includes at least one vehicle without driver and a central management unit, the said vehicle being able to go in automated mode from a starting point to a destination point, thanks to the monitoring signals transmitted by the central unit and following a rail integrated in the pavement on which the vehicle is running. Each vehicle is mounted on tyres and the rail is composed of a rubber strip or equivalent, mounted on the pavement, with continuous optical characteristics and including contactless chip devices such as RFID or transmitters located at regular spacing's. Each vehicle includes localisation and detection means with an antenna suited for transmission of radiofrequency signals towards transponders, these localization and detection means being used to identify the optical characteristics in order to follow the strip during the vehicle motion and to detect the localisation signals received from the transponders reacting to the radiofrequency signals in order to locate the vehicle.

SHORT DESCRIPTION OF FIGURES

The aim, purpose and characteristics of the invention will appear more clearly from the following description referring to the figures where:

DETAILED DESCRIPTION OF THE INVENTION

Figure 1:
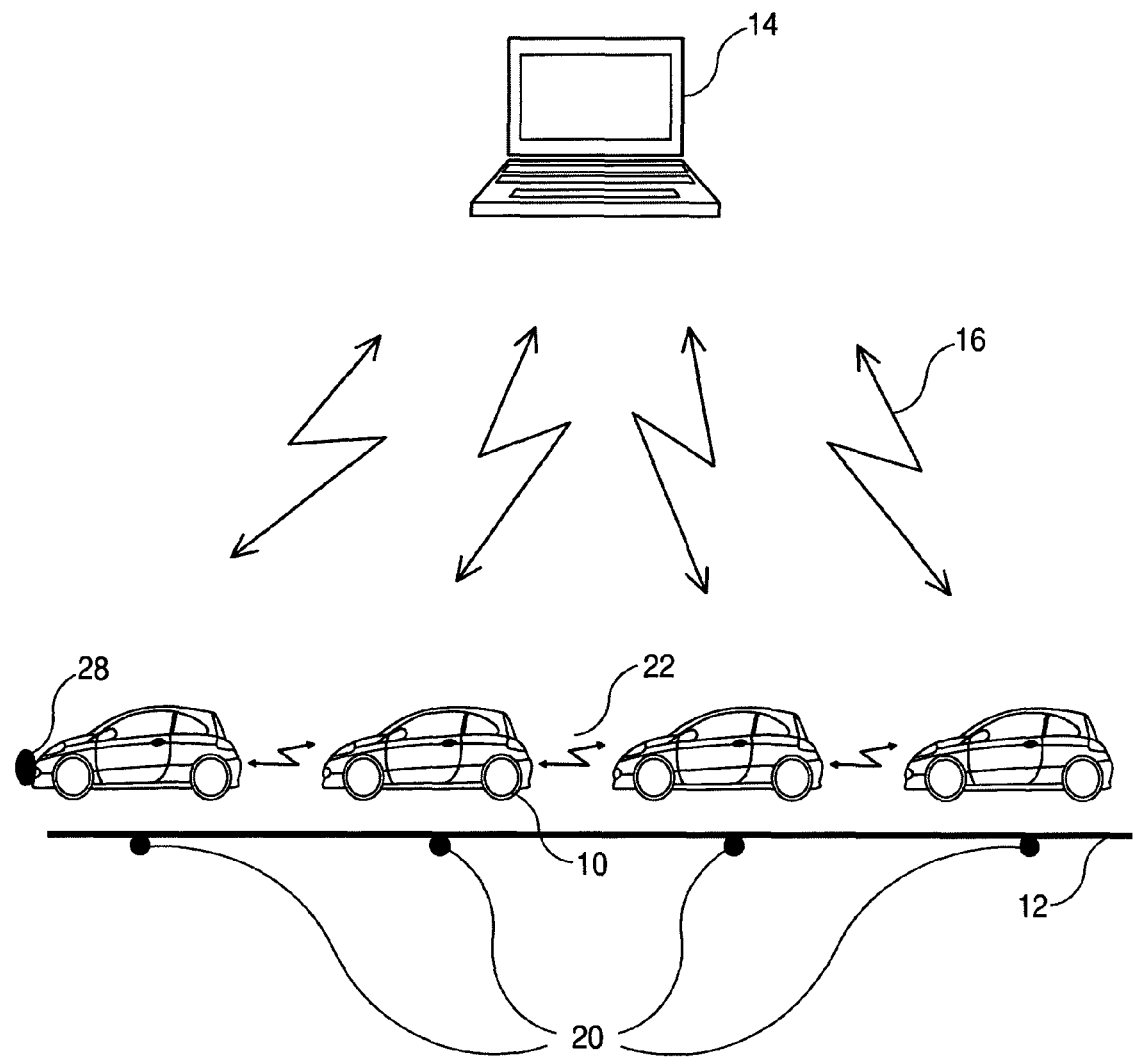
FIG. 1 represents a block diagram of the public transport system according to the invention.

Referring to FIG. 1, the system according to the invention includes one or several vehicles (10) that move along a rail (12), like tramways, but unlike tramways that require heavy infrastructure investments, this rail or guiding string, is composed of a simple rubber strip glued on the pavement, like any other road signaling strip, with specific optical characteristics. The installation cost of the guiding string is very low compared with a conventional rail, and the setting to work time is very short and it does not induce disturbances.

Each vehicle is preferably equipped with 4 seats, facing each other or oriented in the same direction like in a conventional car by rotation of 180 degrees of two seats. The vehicle provides two operation modes: an automated mode without driver, guided by the guiding string, according to the invention, and a manual mode as required (conventional driving).

The original vehicle model has a perfect front back symmetry that allows motion in both directions. The vehicles are propelled by an electric engine in automated mode or by a conventional combustion engine in manual mode. In this last mode, alternative propulsion (such as liquid gas) will be preferred in order to reduce pollution. Any other propulsion may be used. It can be pointed out that the use of conventional combustion propulsion allows reloading the batteries that are needed in automated mode.

Each vehicle (10) is connected to a central unit (14) through a digital radiofrequency link (16). When getting on board a vehicle, the user enters the destination through the means described later. The central unit (14) knows the starting point and the destination of the vehicle and it then computes the most appropriate path. It assesses that the vehicle follows a first rail until point A, then a second rail until point B, etc. . ., in order to finally reach destination. The full set of crossing nodes between guiding strings (12) is accurately defined and stored in the computer installed on board.

Figure 2:
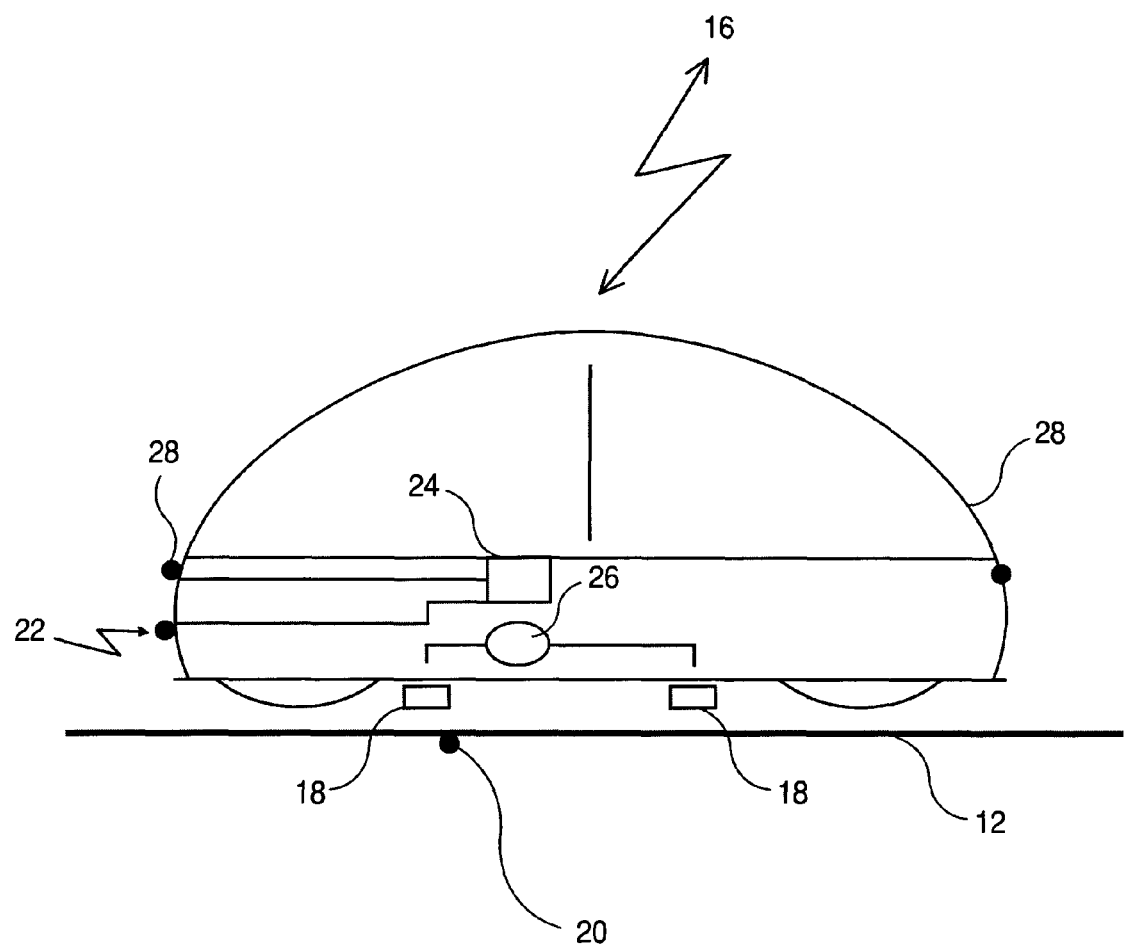
FIG. 2 represents a schematic of a vehicle of the system according to the invention and the vehicle means that make the motion possible.

With reference to FIG. 2, the vehicle moves along the rubber strip or guiding string (12), since it is fitted with optical localization means (18) that allow the vehicle to follow the guiding string which exhibits well defined optical characteristics. In addition, this guiding system is equipped with a set of contactless chip devices (20) such as RFID or transponders that can save their location with great accuracy. These memories are integrated in the strip in order to make them indestructible and operate in passive mode (without power). In this way, the vehicle is very accurately located. In order to avoid an excessive number of passive memories, one will compute the correlation between the accurate localization of the devices and the length of the motion through the number of rotation of the wheels. The distance between two devices could be 50 m for instance.

A fundamental characteristic of the invention is that the vehicles have been designed according to a virtual train mode. In order to achieve this objective, the vehicles can communicate together through several highly secured wireless links with redundancy (22). For instance, the system preferably uses three communication means, such as digital hyper frequency link, analogue radio link and infrared link.

Each vehicle (10) is equipped with an onboard computer (24) which analyses the data exchanges from the communication links between the vehicle (22) and the central computer unit (14). The data are of two types: data related to the motion and data related to the monitoring and the information that compose the reference system.

The data related to the motion are provided by several communication means and are therefore redundant, their perfect correlation allowing a fully secured operation. The data related to the motion are sent to the command and control center (26) which actives the brakes when necessary, the accelerator or the steering. These driving orders are managed by the computer (24).

As mentioned above, each vehicle (10) includes a system (18) for detection of the guiding string (12). The polymer or rubber guiding string with specific optical properties is sensed by the detector (18), right under the longitudinal axis of the vehicle. Any drift on the right or left side induces a compensating action of the steering in order to perfectly put the vehicle back on the axis. Moreover, the detector of guiding strings (18) is fitted with an appropriate antenna that allows transmission of radiofrequency signals that in return receives the localization data saved in the contactless devices located at regular spacing on the guiding string. The detection sensors of the optical strip are CCD type sensors, located under the vehicle body.

In case of damage or degradation of the ground guiding string, the vehicle, thanks to its reference system, is able to proceed with the trajectory, to anticipate turns, until it can find the guiding string again thanks to the accurate localization provided by the contactless devices on the ground below the guiding string and able to achieve remote communication thanks to accelerometers integrated in the vehicle that enable the accurate identification of any motion, and hence the permanent localization even without the guiding string in case of degradation of the strip, and through the correlation with other localization data. When the guiding string is not visible after a few meters (for instance, as a function of its location on mapping), the vehicle stops.

For the geographic positioning, the devices that are integrated in the guiding string allow an accurate identification of the position of the vehicle in town. Each device sends information's that allow the definition of the geographic data of its position.

The onboard computer of the vehicle is fitted with a data base such as mapping, (regularly updated by the central unit) that allows, thanks to the coordinates read from each contactless device and adjusted by odometer, to know its accurate real time position (with an accuracy of the order of 1 cm). These data are sent to the central unit that manages the traffic, the relative position of the vehicles and eventually, the critical situation management.

Preferably, the contactless devices that are installed in the guiding string may be read up to a distance of 1 meter. These devices may be low cost RFID devices, weather proof and that can operate at the standard 13.56 MHz frequency.

Moreover, safety is enforced through the use of sensors (28) located on the sides of the vehicle. These sensors are of three types: infrared, ultrasounds and hyper frequency (radar). These sensors allow real time assessment of the situation, like whether the way is free or not. The data that they send to the command system (26) is analyzed and a real time comparison is made with the reference expert system fitted in the onboard computer (24). A critical situation induces stopping the vehicle for a short period of time. At any moment, since this is a vehicle evolving within a system and not an isolated vehicle, the data related to one vehicle are transferred towards the central unit, and analyzed in order to monitor the vehicle with a redundant safety. The intelligence of the vehicle is designed in order to assess all possible situations. However in case of difficulties for decision making, the vehicle stops and the data and images are transferred to the central computer (14) for an operator to take the decision.

The short range ultrasound sensors allow assessing whether a car is approaching from the vehicle or whether an object is on the way. The backward sensors may be active detectors and they allow the enforcement of a safety distance between vehicles. The front and rear area need to be equipped with sensors with a range greater than those on the side. When the vehicle makes a turn, the sensors that are oriented towards the direction to be taken may be favored.

The infrared sensors, with a range limited to a few meters, allow assessing whether a pedestrian, a motorbike, a bicycle or any other individual is entering this zone. These sensors are fitted all around the vehicle since the vehicle has two possible motion directions.

The hyper frequency sensors (radar) allow assessing the echoes on a distance up to 200 m. These sensors allow for anticipated braking, speed control, always as a function of the map data bases. It has to be noted that this data base includes the driving regulations to be enforced. Traffic lights will be preferably equipped with devices that can inform the relevant vehicles, such as infrared transmission devices with a directivity that is defined in order not to interfere on the ways that are not concerned. All traffic signals are integrated in the map data base; this allows every vehicle to be "awareness mode" at the strategic locations (intersections, stops . . . ). In case of malfunctioning of the infrared traffic lights, the vehicle, which has integrated the driving regulations, fully enforces these regulations. In case of temporary signaling change, the expert system takes the lead, and the central computer may inform the vehicle.

Each leading vehicle of a virtual train of several vehicles is defined by its onboard computer (24) as the master vehicle. The on board computer of the master vehicle manages the data exchanges between the other vehicles of the train. For instance, when the master vehicle detects an obstacle thanks to the obstacle detectors (28), and this requires to slow down, or to stop the train, the electronics of the master vehicle transmits, though the various communication links, the instructions to activate the progressive braking mode, stronger braking or emergency braking. In that fashion, the vehicle train will move according to the instructions of the master vehicle.

Figure 3:
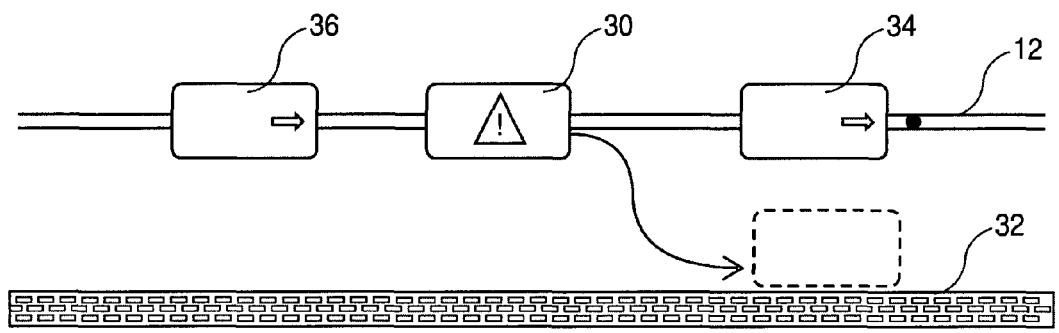
FIG. 3 represents a schematic of the implementation of the procedure to put away a failing vehicle.

Moreover, it may happen that the operative part of a vehicle within the train may be failing (low battery, engine breakdown). In this event, as illustrated on FIG. 3, the failing vehicle leaves the guiding string (12) and the train of vehicles, and parks along the sidewalk thanks to an emergency engine or the starter while still using its detectors. It has to be noted that the master vehicle (34) monitors the vehicles of the train to slow down, such as vehicle (36) that follows the failing vehicle (30) in order to achieve a trouble free manoeuvre.

Figure 4:
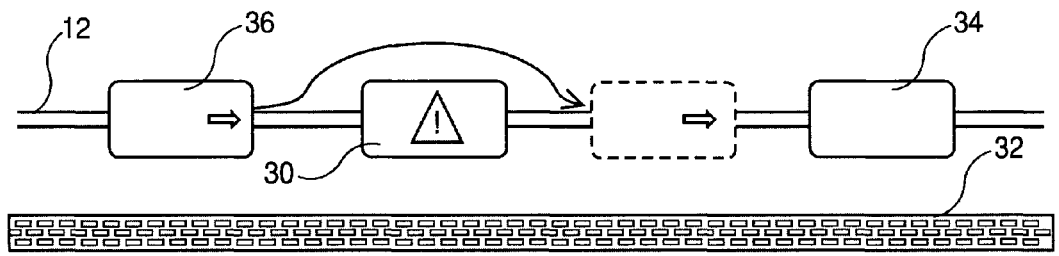
FIG. 4 represents a schematic of the implementation of the procedure of avoidance of a stopped vehicle.

As shown on FIG. 4, it may happen that vehicle (30) may face a total breakdown, and may not be in a position to manoeuvre, or that there is a permanent obstacle, then the expert system of vehicle (36) that follows vehicle (30) deconnects its guidance by the guiding string (12) and follows the procedure for the avoidance of the vehicle (30), in order to come back to the guidance strip, all this happening under the control of the master vehicle (34) that makes enough room for the manoeuvre. Of course, this manoeuvre is repeated for the following vehicles.

It has to be noted that, although the vehicles preferably move within a train of several vehicles, the onboard computer (24) of each vehicle allows the vehicle to move along the guiding string in an individual fashion, in case there is not any train of vehicles going in the same direction.

Figure 5:
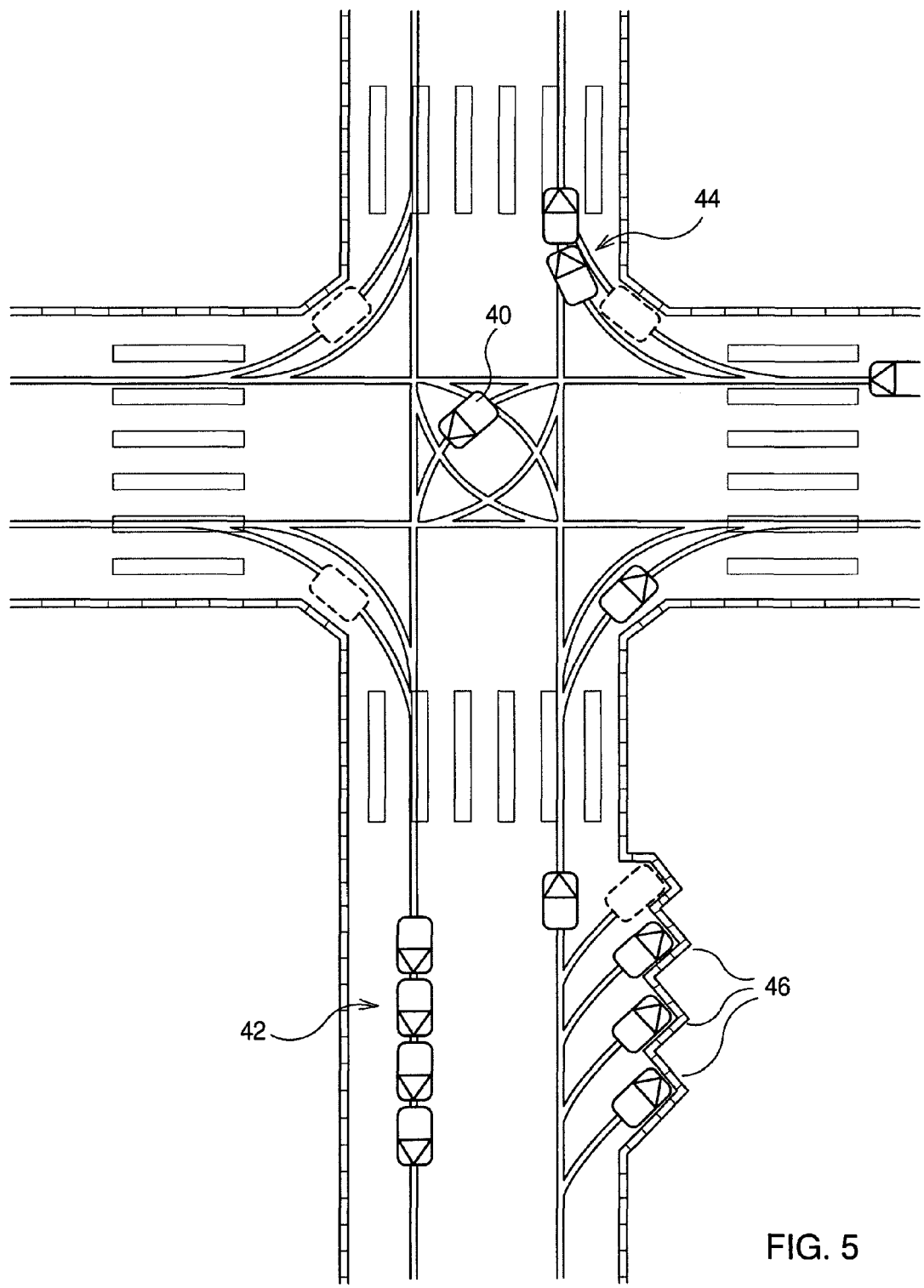
FIG. 5 represents a schematic of a group of vehicles of the system according to the invention while in motion in an urban environment.

In order to achieve an optimized operation of the system according to the invention, the town will be fitted with a set of rails that compose the same guiding string with the highest possible density, as shown on FIG. 5 that describes a network of strips or guiding strings and vehicles according to the invention. Are shown, a vehicle (40) changing directions at an intersection, trains of vehicles (42) or (44), and vehicles (46) being reloaded. When making a train of vehicles, the master vehicle memorizes the destination of each vehicle that follows, together with all the intersections points of the rails where each vehicle will have to change direction.

Within one train, some vehicles will take different directions. In order to achieve these manoeuvres, the on board computer of the front vehicle that has saved in its memory the destination of each vehicle requires, in a timely manner, orders the train to slightly slow down through the transmission supports (22), which allows the vehicle that needs to follow a new path to change direction by following a different guiding string.

In order to achieve a high safety level, the distance between vehicles is a function of speed. When the speed is relatively high (lower than 50 km/h in order to enforce regulations), vehicles are a several meters apart. The distance between vehicles within the same train increases with speed.

The full fleet of vehicles is parked in specific areas that are controlled by any available mean (telephone, Internet, vending machines). The user waits for the booked vehicle or goes to the parking area where several vehicles are available, and then identifies himself with a contactless subscription memory card by presenting it in front of the vending machine located outside the vehicle, that are purpose made. The user then enters the Pin code and this unlocks the vehicle. The user then gets onboard the vehicle and enters the destination by different means (voice command, keyboard, identification number of the vending machine).

The vehicle is then integrated in the next train of vehicles that goes in the requested direction, the on board computer of the vehicle which is waiting starts communicating with the computer of the front vehicle of the train in order to make the appropriate command exchanges that will allow the vehicle that is waiting to start, to accelerate and then slow down to join the queue of the moving train. However, in case of absence of a train in the vicinity going in the same direction, the vehicle starts moving and finds its way to destination since it is equipped with all the necessary means for full autonomy.

It has to be noted that the system is designed to accept car pooling. For this purpose, when a user is entering the destination through the relevant terminal or by phone, this data is transmitted to the central computer that assesses whether other users, with a compatible path, are waiting for a vehicle. The vehicle will be then monitored to stop and take other passengers that are following the same route. The vehicle is fitted with sensors that are capable of remote reading of the contactless cards of the users in order to management the trip fees to be paid.

In the manual mode which is used by exception, the user drives the vehicle in a regular fashion after rotation of the driver seat. When at destination, the user leaves the vehicle which is then ready for another trip.

The system requires 2 types of parking areas, one dedicated to vehicles that are available for motion in automated mode since their battery load level is correct, and one dedicated to vehicles that require loading of their batteries.

The system has also been designed to answer the need for local intensive use. For instance, the central unit being aware that at 11 pm the exit from a theater happens in a defined location, it will drive the automated motion of empty vehicles to areas where a need is identified: the vehicle looks for the user.

As a conclusion, the system according to the invention described above will generate a new mode of living in the city, stress free, noise free, and pollution free. It will make motions easy and without constraint, with a great flexibility of use while respecting individual freedom. As a result of its high level rationale, the system described herein is economically balanced and profitable and offers a sustainable solution for the coming decades.

The invention claimed is:

1. Automated public and individual transport system, comprising
at least one vehicle without a driver, and
a central computer separate from said vehicle,
wherein said vehicle is able to automatically go from a starting point to a destination point along a route using command signals transmitted by said central computer and following a rail which is integrated in street pavement on which said vehicle moves,
wherein said vehicle is an automobile vehicle mounted on tires and said rail is mounted on the pavement, said rail exhibiting continuous optical characteristics and including RFID contactless chip devices or regularly spaced transponders,
wherein said vehicle comprises localization and detection means and an antenna suited for transmission of radiofrequency signals to said transponders, said localization and detection means designed to identify said optical characteristics in order to follow said rail during the motion of the vehicle and to detect localization signals received from said transponders that are reacting to radiofrequency signals so as to localize said vehicle,
further comprising a train of several said vehicles, such that the front vehicle is a master vehicle which memorizes the destination point of each vehicle that is following said master vehicle and a full set of intersection points of the rails where each vehicle will have to change,
wherein the vehicles composing said train of vehicles can communicate together via wireless links using a digital hyper frequency link, an analogue radio link and an infrared link,
wherein the infrared link is adapted to receive instructions from the master vehicle for activation of a progressive braking mode or emergency braking when said master vehicle is facing an obstacle, and
wherein a failing vehicle may leave the rail and the vehicle train using said failing vehicle's emergency engine or starter, and park along a curb while using sensors of said failing vehicle, while the master vehicle controls a speed reduction of the vehicles of the train.

2. The system of claim 1, wherein said vehicle further comprises an onboard computer adapted to receive data related to motion, data related to management, and information transmitted by said central computer through a digital radiofrequency link.

3. The system of claim 2, wherein said onboard computer is fitted with a mapping database which can be regularly updated by said central computer such that an accurate real time position of said onboard computer can be determined based on coordinates transmitted by said transponders and adjusted by an odometer.

4. The system of claim 3, wherein said database includes current road signals and all signaling panels, which allows said vehicle to be aware of intersections.

5. The system of claim 4, wherein said vehicle further comprises a command center adapted to receive said data linked to motion from said onboard computer and to activate commands to said vehicle selected from the group consisting of brake commands, accelerator commands and steering commands.

6. The system of claim 5, wherein said vehicle has outer boundaries equipped with obstacle detection sensors for real time assessment whether the route is obstructed, said sensors adapted to transmit information to said command center for analysis and real time comparison to a reference expert system included in said onboard computer in order to slow down or to stop said vehicle in case of emergency.

7. The system according to claim 6, wherein said obstacle detection sensors are selected from the group consisting of infrared sensors, ultrasound sensors and hyper frequency sensors.

8. The system of claim 1, wherein when a failing vehicle suffers a total breakdown, or cannot maneuver or in case of a permanent obstacle, the vehicle immediately behind disconnects from the rail and goes around the failing vehicle in order to come back to the rail, provided there is sufficient room for the manoeuver based on control of the master vehicle.

9. The system of claim 1, wherein said rail is a rubber strip.

* * * * *